United States Patent [19]

Pullman

[11] 4,059,272
[45] Nov. 22, 1977

[54] GAMES AND EDUCATIONAL DEVICES

[76] Inventor: Burke Cole Pullman, 14 St. Leonard's Terrace, London, S.W.3., England

[21] Appl. No.: 648,156

[22] Filed: Jan. 12, 1976

[30] Foreign Application Priority Data

| Jan. 10, 1975 | United Kingdom | 1054/75 |
| Jan. 28, 1975 | United Kingdom | 3586/75 |
| Apr. 5, 1975 | United Kingdom | 14070/75 |
| Dec. 11, 1975 | United Kingdom | 50931/75 |

[51] Int. Cl.² ............................................. A63F 3/00
[52] U.S. Cl. .......................... 273/130 E; 273/135 F; 273/136 W
[58] Field of Search ....................... 35/35 R, 35 H, 73; 273/130 E, 131 G, 135 D, 136 W

[56] References Cited

U.S. PATENT DOCUMENTS

| 2,547,259 | 4/1951 | Engelhardt | 35/73 X |
| 2,722,061 | 11/1955 | Webster | 35/35 H |
| 3,520,072 | 7/1970 | Greenwood | 35/35 H |
| 3,887,189 | 6/1975 | Dawes | 273/130 E X |

Primary Examiner—William H. Grieb
Attorney, Agent, or Firm—Young & Thompson

[57] ABSTRACT

Apparatus for playing a game comprising a base formed with a number of parallel transverse rows to locate individual blocks carrying letters of the alphabet or other markings, a shield, and a further row at the other end of the base to locate a master selection. Alongside the transverse rows are further locating troughs for marker elements to indicate correct or incorrect selections. In some forms the blocks are separate and in other forms they are provided on rotary dials. The equivalent functions can be provided in a portable electronic unit resembling a calculator.

8 Claims, 9 Drawing Figures

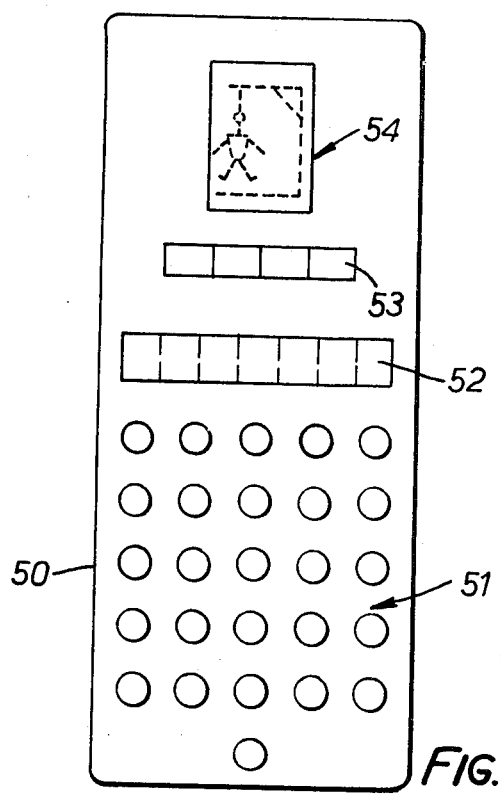
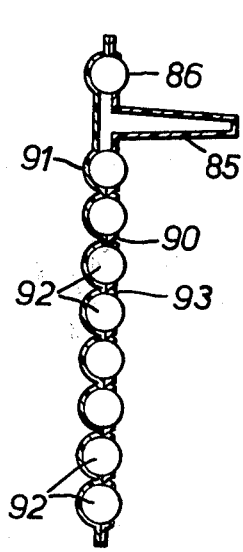
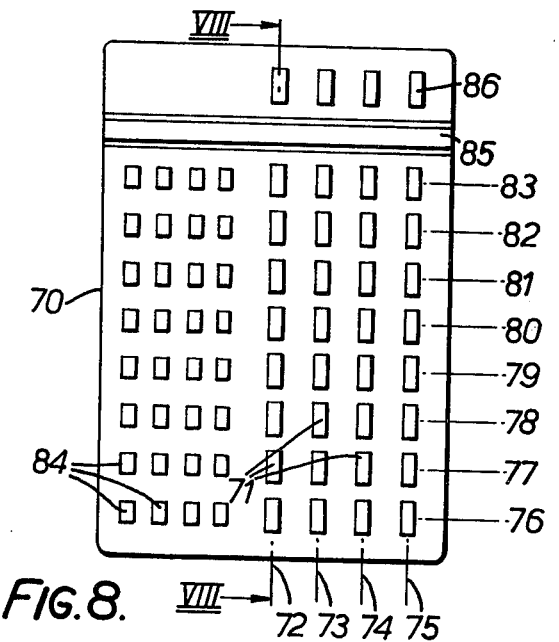

GAMES AND EDUCATIONAL DEVICES

This invention relates to apparatus for playing games or for educational or amusement purposes, and the invention is particularly though not exclusively applicable to spelling games.

Broadly stated from one aspect the invention consists in apparatus for playing a game, comprising a board or base having a plurality of transverse slots, grooves, recesses, or rows of holes, depressions, windows, locating formations or markings to receive or display selected individual playing pieces, and means for mounting a further row of selected playing pieces, such that said further row of playing pieces is concealed from a player observing the first mentioned playing pieces.

In one particular form of the invention the base is provided with a plurality of transverse troughs extending laterally across the base and designed to receive selected groups of individual playing pieces, each carrying a letter of the alphabet. Adjacent one end of the base means are provided to locate a shield, or shroud, to conceal a further row of playing pieces located in a parallel row adjacent this end of the base. In playing the game a first player selects a group of playing pieces to spell for example a four or five letter word, and places these in the adjacent row facing towards himself, so that the faces of the pieces are concealed from the second player. The second player then selects a group of playing pieces, more or less at random, and inserts them in the first transverse trough. Each playing piece may have letters on both faces so that they can be seen simultaneously by both players. The first player checks these letters with the letters in this concealed selection, and inserts appropriate marking pieces in further locating formations provided in the base aligned transversely with the troughs. The second player then proceeds to make further selections, and by deduction or by a hit-and-miss process attempts to achieve a group of letters which correspond exactly to the concealed group.

According to a preferred feature of the invention the base is formed as a thin-walled plastics moulding or vacuum formed from a single sheet of plastics. The base may have a further transverse slot, groove, recess, or row of holes or depressions on the side of the shield adjacent the first mentioned end. Moreover each transverse slot, groove, recess or row of holes or depressions, may be associated with a further locating formation aligned transversely therewith, to receive one or more mounting pieces.

From another aspect the invention consists in apparatus for playing a game comprising a portable electronic calculator with a visual read-out device for displaying a selection of letters, a plurality of input keys representing individual letters of the alphabet, programming means including a memory device to select a plurality of letters which will be displayed in the readout, and comparator means for comparing the input from one of the alphabet keys with the programmed letters and for indicating identity, or otherwise, in the readout display.

The apparatus may also include a numerical read-out device for indicating a score, and means for automatically varying the score in accordance with the identity or lack of identity signal from the comparator.

The alphabet keys may also be associated with a programming circuit for setting up a selected group of letters in the memory device.

According to a preferred feature of the invention the apparatus also includes an electronic pictorial display read-out arranged to provide a visual diagram comprising a plurality of individual sections, and a control circuit for illuminating the sections in a build-up sequence in accordance with identity signals received from the comparator.

The invention may be performed in various ways and several embodiments will now be described by way of example with reference to the accompanying drawings in which.

Figure 5:
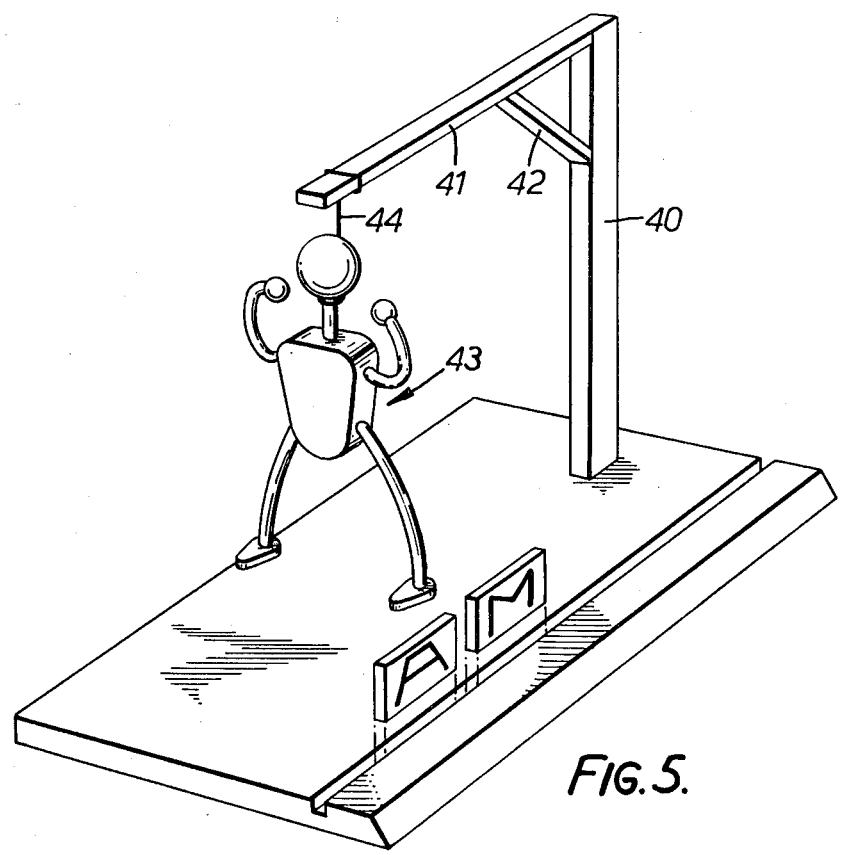
Figure 6:
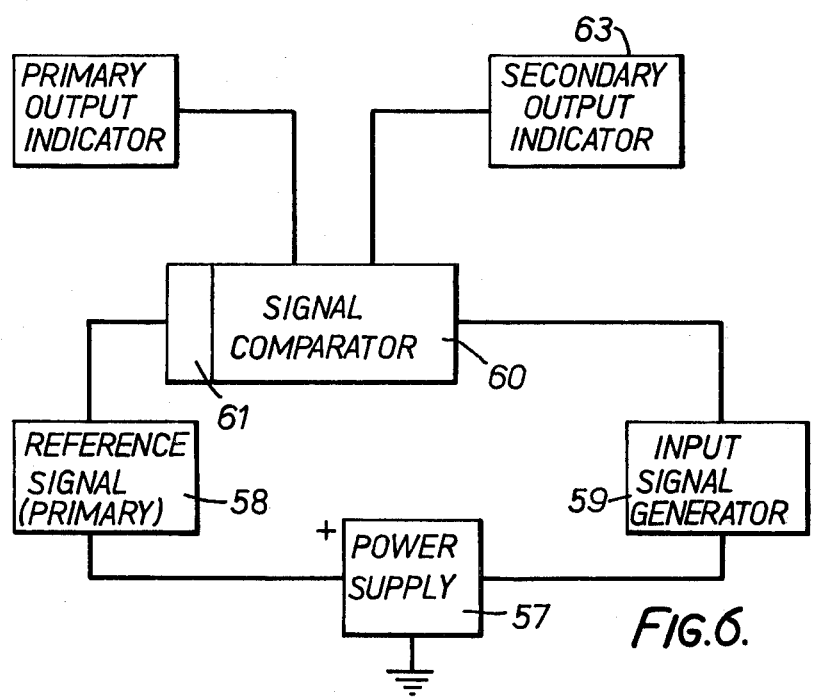

FIG. 5 is a perspective view illustrating another embodiment of the invention including a scaffold and hanging figure, FIG. 6 is a circuit diagram of an electronic version of the invention, FIG. 7 is a view of the front panel of the embodiment of FIG. 6, FIG. 8 is a plan view of another form of amusement apparatus according to the invention for playing a spelling game, and FIG. 9 is a sectional side elevation on the line II — II in FIG. 8.

Figure 1:
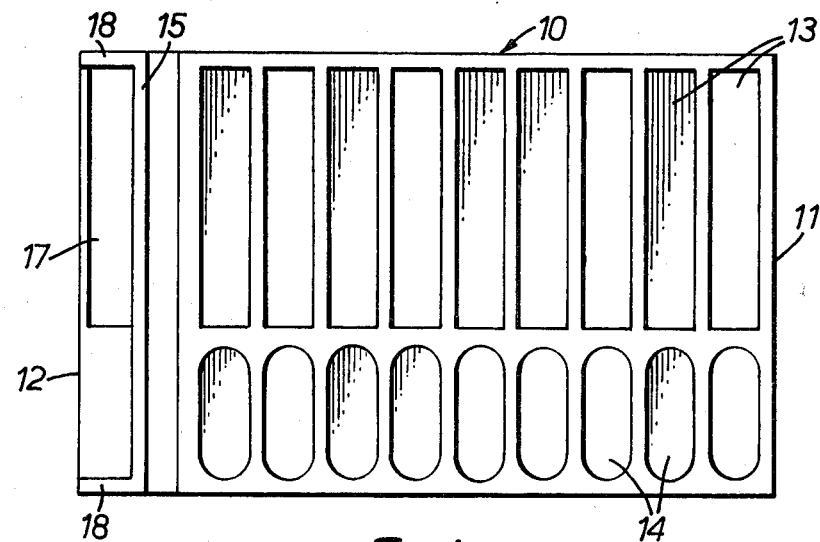
FIG. 1 is a plan view of the base of a first embodiment.

The apparatus to be described forms a base for playing a spelling game. The base is formed of a synthetic plastics material by injection moulding, or by a vacuum forming technique. In plan the base is generally rectangular, as shown in FIG. 1, and has a generally planar surface 10 rising at a shallow angle from one end 11 of the base to a point adjacent the other end 12 of the base. In this planar portion 10 there are formed nine transverse parallel shallow troughs 13, each of generally rectangular shape and designed to receive, say, four or five playing pieces in the form of square shaped tiles. Aligned transversely with each of these troughs 13 is a further oval trough 14 designed to receive marking pieces which may be in the form of circular tiles of appropriate colour. The playing tiles carry letters of the alphabet and in this example the tiles are intended to be laid flat in the troughs 13 so that they can be seen by players at both ends 11 and 12 of the base. To assist reading the tiles from both ends each tile may have the letter duplicated and inverted. Between the part 10 and the end 12 of the board, there is an upstanding ridge 15, with a sloping wall facing the end 11 and a vertical wall 16 on the other side. This wall 16 may indeed be undercut or overhanging. At the foot of the wall 16 there is a further transverse depression 17 to receive a row of letter tiles selected by the player at the end 12. A ramp shaped wall 18 extends up to the top of the ridge 15 at both sides and thus conceals the tiles in the trough 17 from an angled point of view.

In use the first player, or teacher, selects four of the tiles to form a word and without displaying this selection to the other player or pupil the four tiles are positioned in the trough 17 and therefore are invisible to the player or pupil at the right-hand side of the base. The second player then selects, more or less at random, a first group of four tiles and places them face upwards in the first transverse trough 13. If any one of these letters is correct, i.e. it tallies with one of the letters in the "datum" row 17, the first player will place a selected one of the markers in the corresponding trough 14. If one of the letters in this row 13 is also in the correct position in relation to the selected work in row 17, a different one of the markers will be used. The number and type of markers put in the trough 14 will thus indicate to the second player how may letters are correct and how many are also correctly positioned. The second player then makes another selection of four tiles and places them in the next row 13 and the same procedure is followed. By a combination of chance and skill, and by a process of deduction and elimination, the second player can eventually determine the correct word in row 17, the object of the game or teaching programme being to achieve this correct solution in as small a number of rows as is possible.

The base as described is extremely economical to manufacture and greatly facilitates play. The playing tiles can be readily inserted in the troughs, and equally readily removed. The tiles in the master selection trough 17 are effectively concealed from the other player, both when viewed along the length of the base, and also in an angled direction. Since the shield is integral with the base, it is less likely to be lost or damaged, it will not become displaced during the game, and the whole unit is of extremely light-weight and convenient dimensions. As described it is suitable for vacuum forming techniques: if injection moulded the face 16 of the shield may be overhanging to provide better concealment.

In the example described the playing pieces carry letters of the alphabet and the game is principally intended as a form of spelling game. The pieces may, however, carry other markings such as numerals, symbols, designs, or other indicia in which case the rules of the game will be modified though the principle is essentially the same. It will be understood that the board may be designed to receive rows of pieces of any desired number. Instead of detachable playing pieces such as tiles, the required selections of letters or other characters may be made by providing rotary dials or drums below separate windows in the board, each dial or drum carrying a large number of letters or characters which can be selected simply by manual rotation.

The board may also be designed to provide for simultaneous use in more than one game. For example, it may be duplicated with a concealing shield at each end aligned with transverse troughs, as illustrated in the drawings. Each player then plays two games simultaneously, setting one concealed master row for his opponent and making trial rows against a group concealed by the opponent. In a further possible modification the board may have two lay-outs in parallel with the concealing shields both at the same end. The master player can then play two games simultaneously against two opponents.

To facilitate inspection of the tiles by both players, each tile may carry duplicate inverted letters or characters, or the whole base may be mounted on a turntable. If designed as a travelling pack means are preferably provided for anchoring the tiles temporarily in selected positions. This could be magnetic, for example with a ferro-magnetic sheet embedded in the base and small permanent magnets set into each tile. Alternatively the channels or grooves in the base may be undercut and separated by T section ribs with the tiles appropriately shaped to be slid into position along the grooves.

Figure 4:
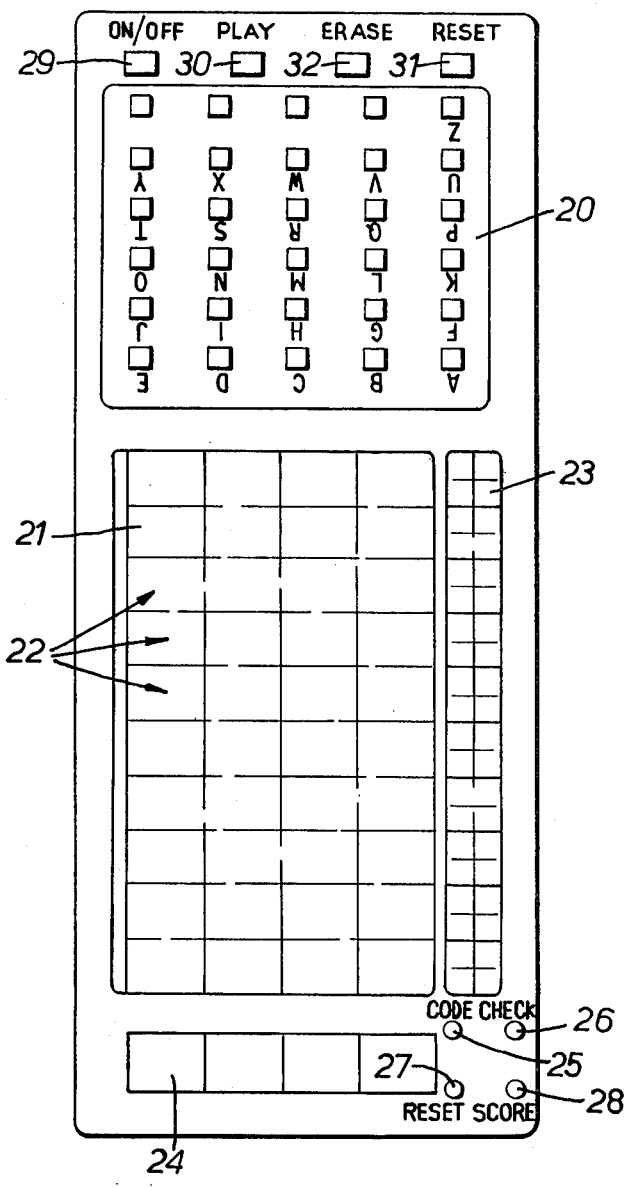
FIG. 4 is a plan view of an electronic version of the apparatus.

The invention can also be applied to electronic portable equipment with provision for carrying out the same basic functions. A typical example is illustrated in FIG. 4, resembling a pocket calculator. In this example the instrument has a panel 20 with twenty six or more press buttons corresponding to the letters of the alphabet. There is also a main display panel 21 with individual display sections 22 each provided with means for displaying any selected letter of the alphabet. These sections are arranged in four longitudinal rows and ten or more transverse rows to provide for a series of different spelling attempts. Aligned with the transverse rows in a further panel 23 are individual scoring display sections for indicating the correctness or otherwise of the spelling group in the corresponding row. At the other end of the instrument is a master display panel 24 with four sections each having a multiple display unit for illuminating any selected letter, and four control buttons 25-28 as indicated.

In use, after switching on the circuit by means of the switch button 29 the first player presses the code button 25 and then enters four letters by pressing appropriate alphabet buttons in panel 20. These are stored automatically in an electronic memory but can be checked at any time by pressing the check button 26 which illuminates the letters in panel 24. A cowl prevents the second player from seeing the letters. The second player then presses the play button 30 and enters a first row of four letters using the alphabet buttons 20 and these appear in the top row of panel 21. When the first player presses the score button 28 an internal comparator circuit compares these letters with those in the memory and provides a visible score in section 23, to indicate the number of letters which are correct and the number which are in the correct positions. The second player repeats the operation as many times as necessary until the correct word is determined, which will be indicated automatically in the score panel 23. Both players then re-set by pressing their re-set buttons 27,31, and the game can be restarted. If the second player makes an unintentional mistake in a row the whole row can be cleared by pressing the erase button 32. It will be understood that this instrument avoids the necessity for any mental scoring and after the first player has entered a word in the memory he need take no further part in the game.

FIG. 5 illustrates another embodiment in which a similar word base game is used in combination with a multi-piece construction representing a scaffold and hanging figure. The construction acts as a visual incentive and also as a scorer, possibly in addition to a conventional scorer. As illustrated, the scaffold is in three detachable sectons 40, 41, 42, conveniently with detachable tapered dowel joints, and the hanging figure 43 is likewise formed in eight detachable sections, with a hanging rope 44.

In use the individual sections of the scaffold and figure will be added in sequence when any letter is incorrectly guessed. If a letter is correctly guessed the appropriate marking piece is inserted as described previously. The game therefore becomes a race between the handing of the figure and the correct guessing of the complete word.

As a further alternative the scaffold and hanging figure may be replaced by a model guillotine with a figure having a detachable head to rest on a block below the blade of the guillotine and held to the body of the figure by a magnet. The guillotine and figure will be assembled in the same way as the hanging figure and scaffold, when any letter is incorrectly guessed. On the final move a pin is withdrawn, the guillotine blade falls and the figure is decapitated by simply breaking the magnetic attraction.

Instead of a three-dimensional construction, a two-dimensional figure construction may be used. For example the apparatus may include a flat board onto which components of the construction are fixed in sequence, the components being held in position by pegs, slots, magnetic elements, or by means of a barbed textile material such as Velcro. Alternatively the apparatus may include a booklet with transparent printed overlays, such that by turning the pages the elements of the figure are added in sequence, this latter form being particularly applicable for use as a travelling kit.

To prevent one player taking too long in making a guess the apparatus kit may also include a simple timer such as a sand glass.

FIGS. 6 and 7 illustrate an electronic portable apparatus for playing somewhat similar games. The front of the case 50 has a number of alphabet keys 51 representing each of the letters of the alphabet, a read-out indicator 52 for displaying up to, say, twelve letters of a word, a further numerical read-out display 53 to indicate a score and, alternatively or in addition, a pictorial L.E.D. type read-out display 54 portraying a sectionised simple diagram of a scaffold and hanging figure.

The electrical circuitry of the apparatus is shown in simple diagrammatic form in FIG. 6. The apparatus includes a power supply 57, which may be a battery, or mains input, and a primary reference signal generator 58 for programming the unit to a selected group of letters, usually representing a word. This selection is held in a magnetic or electronic memory 61 and displayed in the read-out 52. The selection may be pre-programmed and may, for instance, include a large number of words from which any one word will be selected at random. Alternatively, the alphabet keys 51 may be used initially to programme the selection. In using the apparatus a second player guesses letters of the word at random and the appropriate alphabet key 51 is depressed which actuates the input signal generator 59 and the letter is compared in the signal comparator 60 with the selected letters stored in the memory 61 from the primary reference signal generator 58. If a correct letter is guessed the identity will be recognised by the comparator and the appropriate letter would appear in the display 52. Simultaneously a digital score would appear in the display 53 produced from a secondary output indicator 63. Alternatively, or in addition, a sub-component of the visual diagram display 24 would be illuminated to show a progressive build-up in the scaffold and hanging figure.

The apparatus illustrated in FIGS. 8 and 9 comprises a base 70 provided with a plurality of selector windows 71 arranged in four rows 72, 73, 74, 75 and eight banks 76 to 83. Thus there are thirty two such windows 71. Alongside these selector windows are an equivalent arrangement of thirty two scoring windows 84 also arranged in four row and eight banks such that there is one scoring window 84 provided as a counterpart to each of the selector windows 71. In addition, the base 70 has an upstanding shield 85 and a further bank of four selector windows 86, partly shielded by the shield 85. These windows 86 are aligned with the four rows of windows 72 to 75.

The base 70 is formed from two separate moulded plastics members 90,91 joined together around their periphery and at intermediate points, and formed with mating recesses or pockets to receive a plurality of rotary dials 92, one in poisition below each of the windows referred to above. The upper moulded member 90 has arcuate semi-cylindrical domes 93 which overly the upper parts of the rotary dials, and each dome is formed with a cut-out which constitutes the respective window 71 or 84. Thus, a part of each rotary dial is visible through the window and is also accessible to the window so that it may be turned by the player's finger or thumb. To assist this turning movement each dial may be provided with a projecting peripheral flange which stands proud and may project through a separate slot adjacent the window 71 or 84 as the case may be.

Instead of having domes 93 the moulded member 90 may be flat, with aperatures through which the dials protrude or can be manipulated. Also instead of providing one scoring window 84 for each of the selector windows 71, in some cases it may be sufficient to have one scoring window for each pair or group of selector windows.

Figure 2:
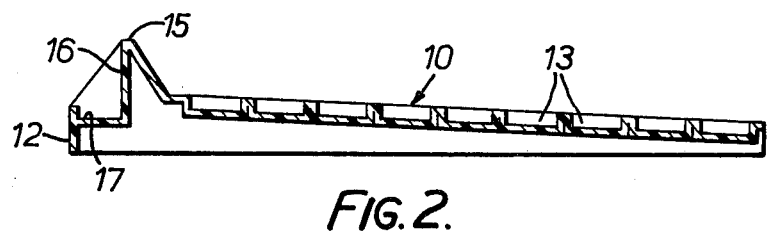
FIG. 2 is a sectional side elevation of the base.
Figure 3:
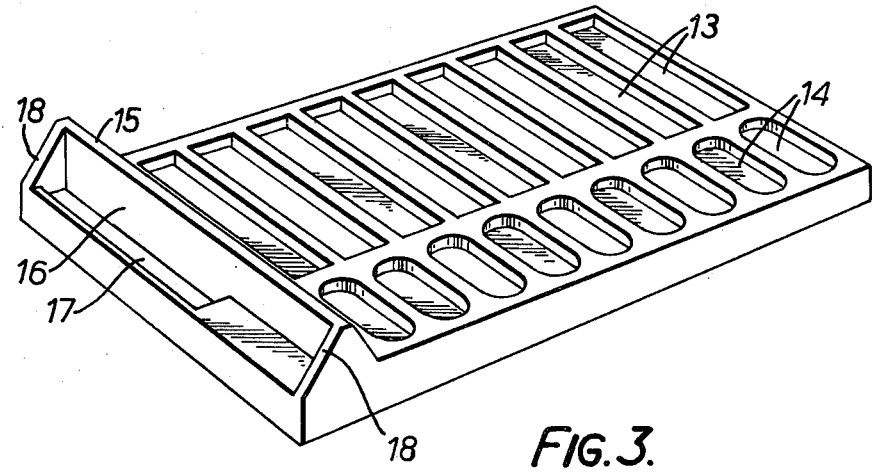
FIG. 3 is a perspective view thereof.

In all these embodiments the base or board may be split up if required so that the shield 15 or 85 and its associated row are separate or separable from the remainder of the apparatus. The playing and marking tiles provided for use with the apparatus of FIGS. 1 to 3 for example may be square, circular or of any other suitable shape and may be formed with pegs to locate in small holes in the base, or may themselves be provided with holes or apertures to fit over pegs formed in the base.

In the electrical versions of the game, as illustrated in FIG. 4, in lieu of an automatic scoring facility operated by the button 28 there may be a manually operated scoring system whereby the player calculates the score himself and inserts this via appropriate scoring buttons to the read-out display 23. Also in these electronic versions there may be provision for programming the circuitry via any conventional type of programming means such as punched cards or tapes, or magnetic programming cards.

I claim:

1. Amusement or educational apparatus comprising a plurality of playing pieces carrying various different markings, a plurality of scoring pieces, different from said playing pieces, and a base having a plurality of transverse rows of locating formations or markings to locate and display a group of selected individual playing pieces, the said base also having additional locating formations or markings to locate and display at least one scoring piece in association with each row of playing pieces, and including means for mounting a further row of selected playing pieces, and means for concealing said further row of playing pieces from a player observing the first mentioned group of playing pieces.

2. Apparatus according to claim 1, wherein each of said playing pieces carries a letter of the alphabet.

3. Apparatus according to claim 1, including scoring pieces of two different types, and wherein said additional locating formations for said scoring pieces are formed to receive two of said scoring pieces aligned with each said row of playing pieces.

4. Apparatus according to claim 1, wherein said playing pieces are readily removable from said base.

5. Apparatus according to claim 1, wherein the base includes an upstanding shield for concealing the said further row of playing pieces.

6. Apparatus according to claim 1, wherein the base is formed as a thin-walled plastics moulding.

7. Apparatus according to claim 1, including a scorer which comprises a number of separate constructional elements which can be assembled in sequence to form a construction providing a visual indication of the total score.

8. Apparatus according to claim 7, in which the said elements form parts of a scaffold and hanging figure.

* * * * *